(12) United States Patent
Koury et al.

(10) Patent No.: US 10,893,769 B2
(45) Date of Patent: Jan. 19, 2021

(54) BEVERAGE MACHINE MATERIAL HOLDER

(71) Applicant: Keurig Green Mountain, Inc., Burlington, MA (US)

(72) Inventors: Steffen F. Koury, Nahant, MA (US); Paul K. Metaxatos, Swampscott, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 73 days.

(21) Appl. No.: 16/121,352

(22) Filed: Sep. 4, 2018

(65) Prior Publication Data

US 2019/0069708 A1 Mar. 7, 2019

Related U.S. Application Data

(60) Provisional application No. 62/554,209, filed on Sep. 5, 2017.

(51) Int. Cl.
*A47J 31/06* (2006.01)
*A47J 31/52* (2006.01)

(52) U.S. Cl.
CPC ........... *A47J 31/0642* (2013.01); *A47J 31/52* (2013.01)

(58) Field of Classification Search
CPC .... A47J 31/0642; A47J 31/52; A47J 31/5253; A47J 31/5251; A47J 31/525; A47J 31/06; A47J 31/22; A47J 31/58; A47J 31/56; A47J 31/4407; A47J 31/3676; A47J 31/3695; A47J 31/0673; A47J 31/3633; A47J 31/00
USPC ......... 99/279, 280, 283, 295, 300, 304, 306, 99/307, 317, 321
See application file for complete search history.

(56) References Cited

U.S. PATENT DOCUMENTS

| | | | | |
|---|---|---|---|---|
| 5,840,189 | A * | 11/1998 | Sylvan | B65D 85/8043 210/474 |
| 7,165,488 | B2 * | 1/2007 | Bragg | A47J 31/0673 99/295 |
| 8,336,729 | B2 * | 12/2012 | Kelly | B65D 81/3811 220/592.16 |
| 9,481,507 | B2 * | 11/2016 | Abegglen | B65D 85/8043 |
| 2005/0126399 | A1 * | 6/2005 | Bragg | A47J 31/3676 99/279 |
| 2008/0095904 | A1 * | 4/2008 | Sullivan | A47J 31/32 426/431 |
| 2010/0178392 | A1 * | 7/2010 | Yoakim | A47J 31/0642 426/80 |
| 2015/0257582 | A1 | 9/2015 | Oh | |

* cited by examiner

*Primary Examiner* — Phuong T Nguyen
(74) *Attorney, Agent, or Firm* — Wolf, Greenfield & Sacks, P.C.

(57) ABSTRACT

A beverage machine with a holder including front and side walls around an opening where beverage material is held to form a beverage where the walls slope downwardly and inwardly toward the opening. A peripheral wall may extend upwardly from the opening and form a trough around the opening with the front and side walls.

8 Claims, 6 Drawing Sheets

BEVERAGE MACHINE MATERIAL HOLDER

CROSS REFERENCE TO RELATED APPLICATION

This application claims the benefit of U.S. Provisional Application No. 62/554,209, filed Sep. 5, 2017, which is hereby incorporated by reference in its entirety.

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Patent Application publication 2008/0134902 discloses a beverage forming system that heats water in a reservoir and pneumatically delivers the heated water to a brew chamber for making a coffee drink or other beverage. U.S. Pat. No. 7,398,726 discloses another beverage forming system that delivers heated water from a dispensing tank to a brew chamber by pneumatic forcing of the water from the metering tank. U.S. Patent Application publications 2009/0120299 and 2008/0092746, and U.S. Pat. Nos. 3,511,166, 3,958,502, 4,602,145, 4,263,498 and 8,037,811 disclose other system types in which water in a heater tank or heat exchanger is forced to flow out of the tank and to a beverage making station by introducing unheated water into the tank/exchanger.

SUMMARY OF INVENTION

Some aspects of the invention relate to arrangements for allowing a user to easily clean a brew chamber area, particularly an area around an opening where beverage material, such as coffee grounds, are received for making a beverage. Areas around such an opening can be made dirty by beverage liquid, coffee grounds and other debris, and arranging this area so as to self-clean and/or make user cleaning easier can provide a more sanitary and pleasing user experience.

In one embodiment, a beverage forming system includes a liquid supply arranged to provide a liquid for forming a beverage, a brew chamber arranged to hold a beverage material for mixing with the liquid to form a beverage, and a liquid conditioner arranged to heat or cool the liquid that is provided to the brew chamber. A control circuit may be arranged to control the liquid supply and the liquid conditioner to deliver heated or cooled liquid to the brew chamber to form the beverage. For example, the control circuit may control a pump to pump water to a water heater that heats the water, which is then delivered to the brew chamber for mixing with a beverage material. In some embodiments, the brew chamber includes a holder with an opening in which the beverage material is provided and held by the holder. For example, a beverage cartridge containing beverage material (such as coffee grounds) may be provided to the holder, or the holder may be provided with unpackaged material, such as loose coffee grounds. In some arrangements, the holder may include walls that slope downwardly and inwardly toward the opening on at least a front side and left and right sides of the opening. Such downward and inward sloping of walls around the opening may help direct liquid and other materials to a collection area to allow for easier cleaning and/or direction away from the opening. Such materials may travel along a path that is separate from a beverage outlet path. For example, in some arrangements, liquid and other material directed toward the opening by the sloped walls may be drained through the opening to a drip tray or other waste bin. In some cases, the walls at the front side, left side and right side of the opening may each have a cross section along a line extending radially outwardly from the opening that has an upside down U-shape. With this arrangement, areas of the walls radially inward from an uppermost portion of the walls may direct liquid and other debris inwardly toward the opening, and areas of the walls radially outward from the uppermost portion may direct liquid and other debris outwardly away from the opening. This may help keep the area around the opening free of unwanted materials.

In one embodiment, walls at the front side, left side and right side of the opening form a U-shaped wall having a continuous curve. For example, the walls around the opening may form a kind of barrier that has a smooth, seamless shape that helps direct debris toward the opening as well as provides an easily cleaned surface, such as by wiping with a cloth.

In some embodiments, the holder includes a peripheral wall that extends upwardly from the opening such that the peripheral wall and the walls at the front side, left side and right side of the opening together form a trough around the opening. With this arrangement, the trough formed around the opening may collect unwanted liquid and other material, either for removal and cleaning by a user or for draining away from the opening. In some cases, the holder includes a cartridge receiver arranged in the opening, and the cartridge receiver may include a peripheral wall that extends upwardly from the opening such that the peripheral wall and the walls at the front side, left side and right side of the opening together form a trough around the opening. In some arrangements, the holder includes a bottom wall in which the opening is formed, and the bottom wall may be planar and extend outwardly from the opening to the walls at the front side, left side and right side of the opening. In some embodiments, a peripheral wall may be formed as part of the bottom wall.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
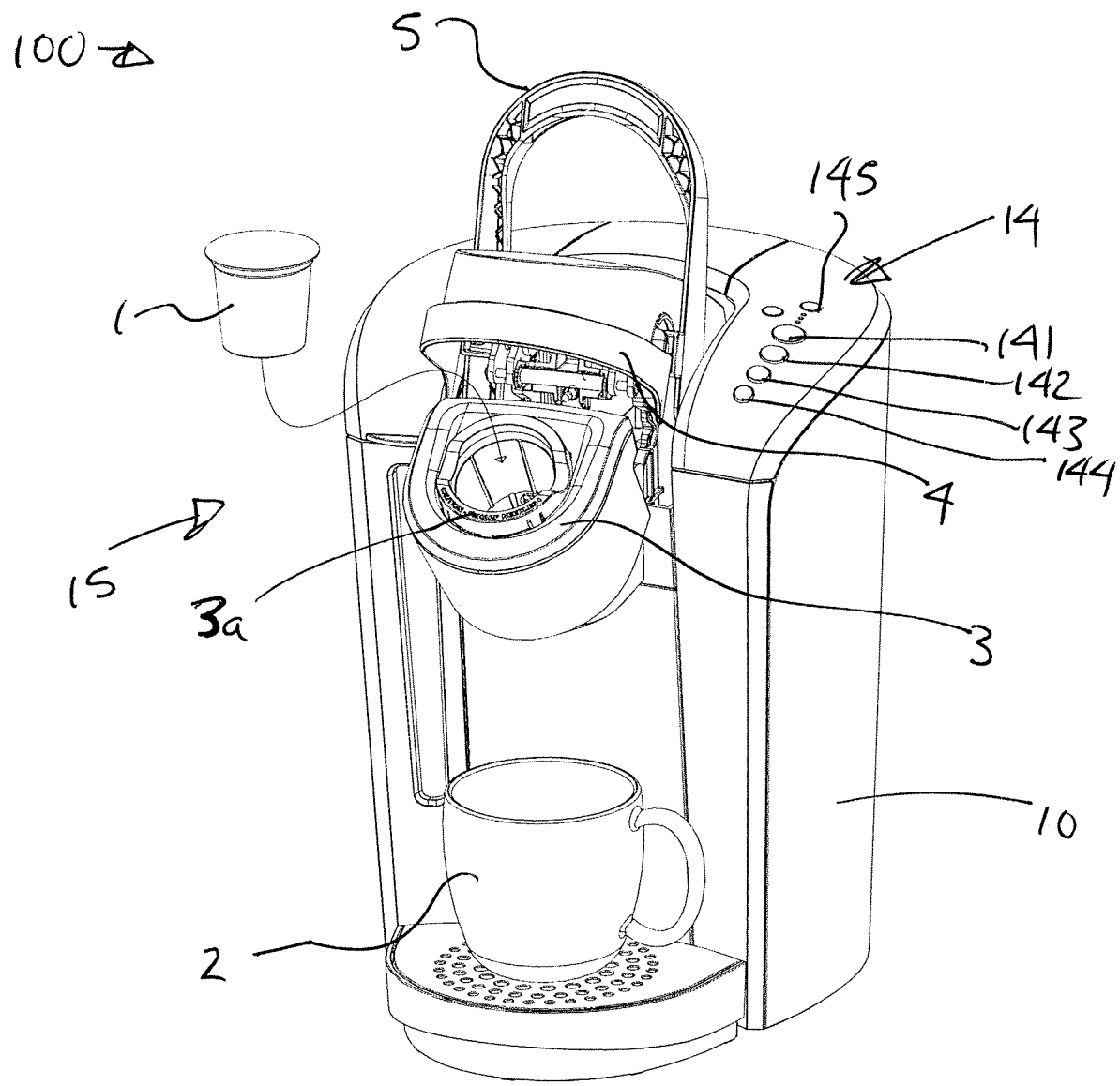
FIG. 1 is a right side perspective view of a beverage forming system in an illustrative embodiment.
Figure 2:
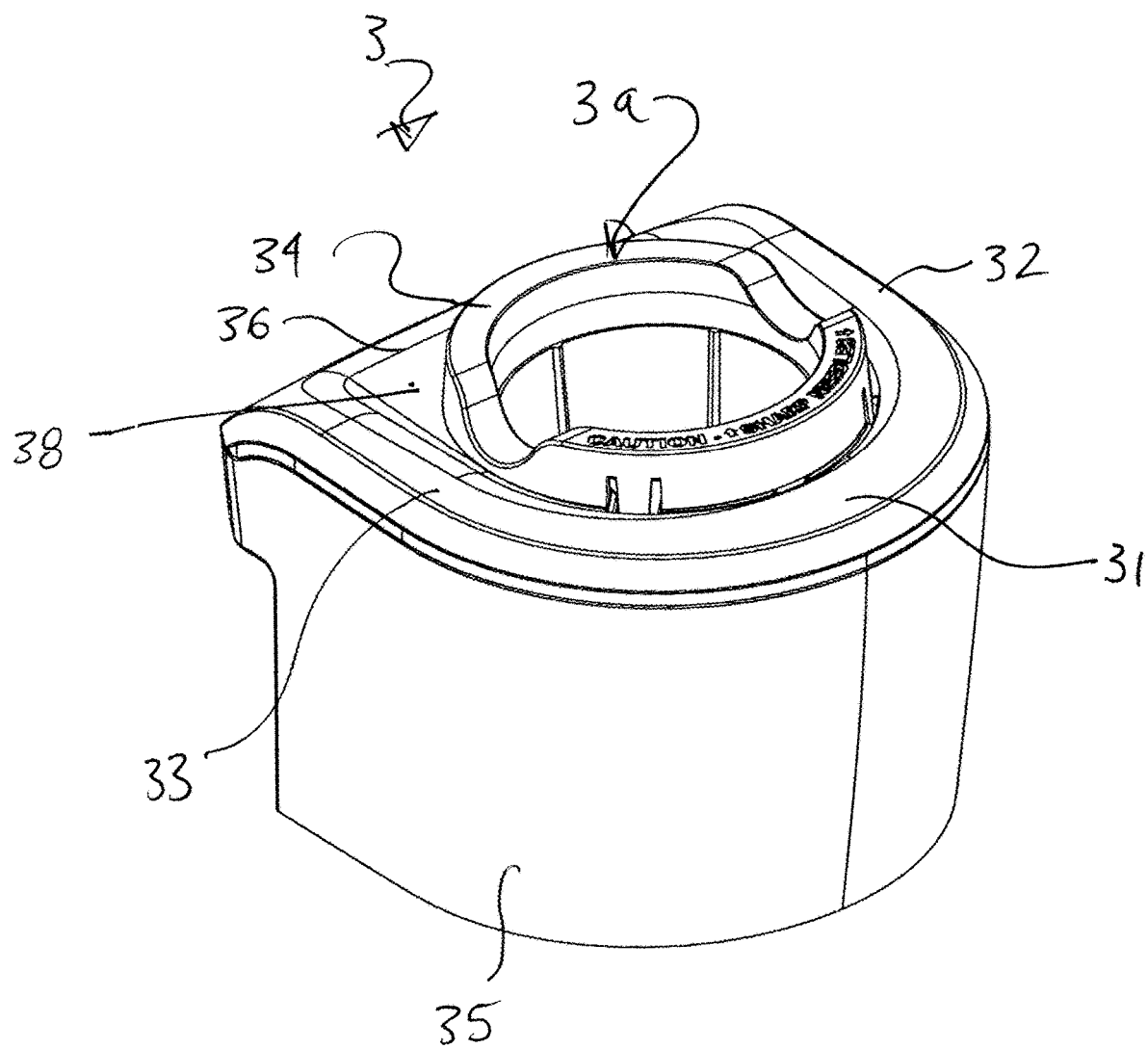
FIG. 2 is a left side perspective view of the beverage material holder in the FIG. 1 embodiment.
Figure 3:
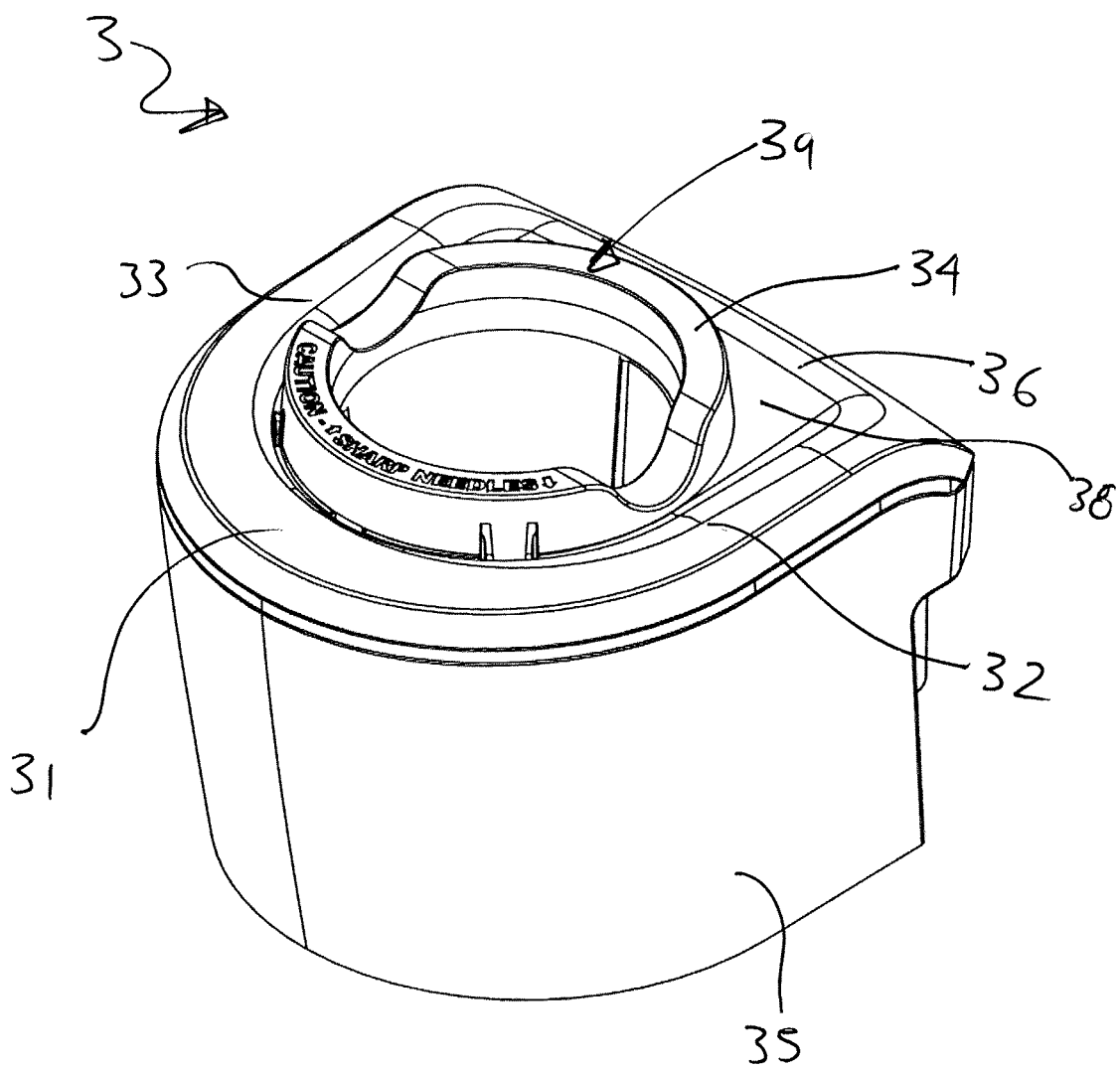
FIG. 3 is a right side perspective view of the beverage material holder in the FIG. 1 embodiment.
Figure 4:
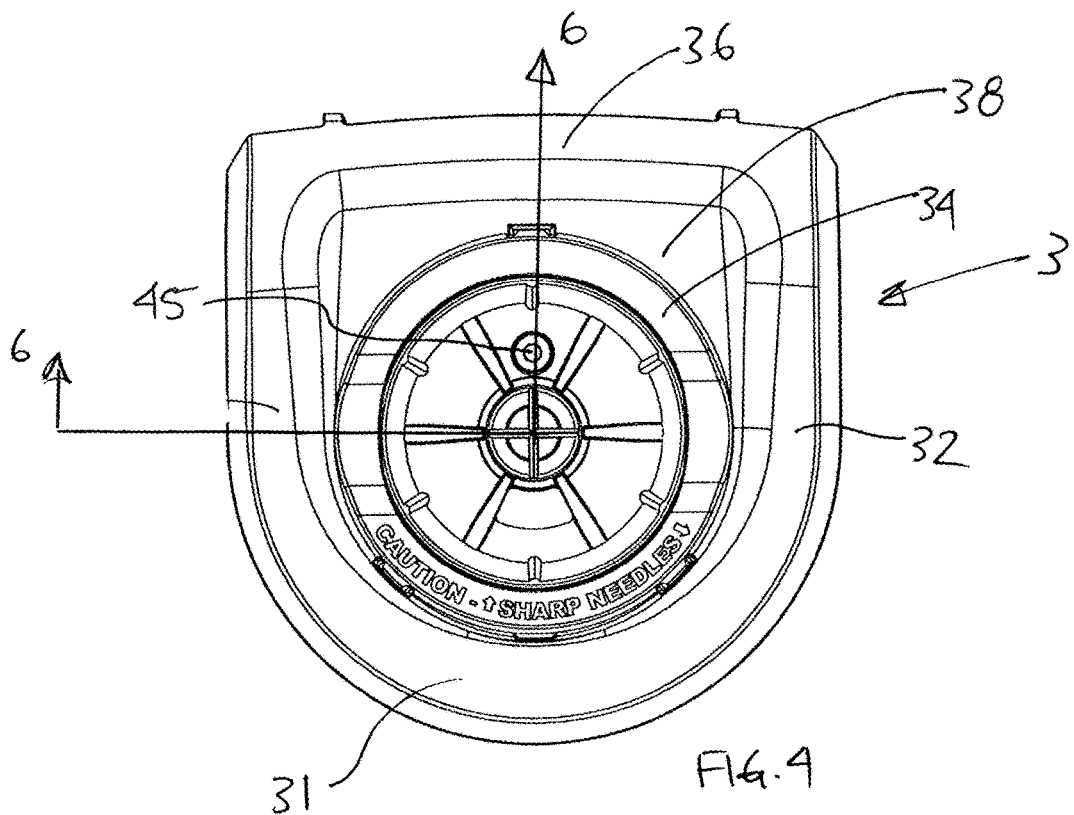
FIG. 4 is a top view of the beverage material holder in the FIG. 1 embodiment.
Figure 5:
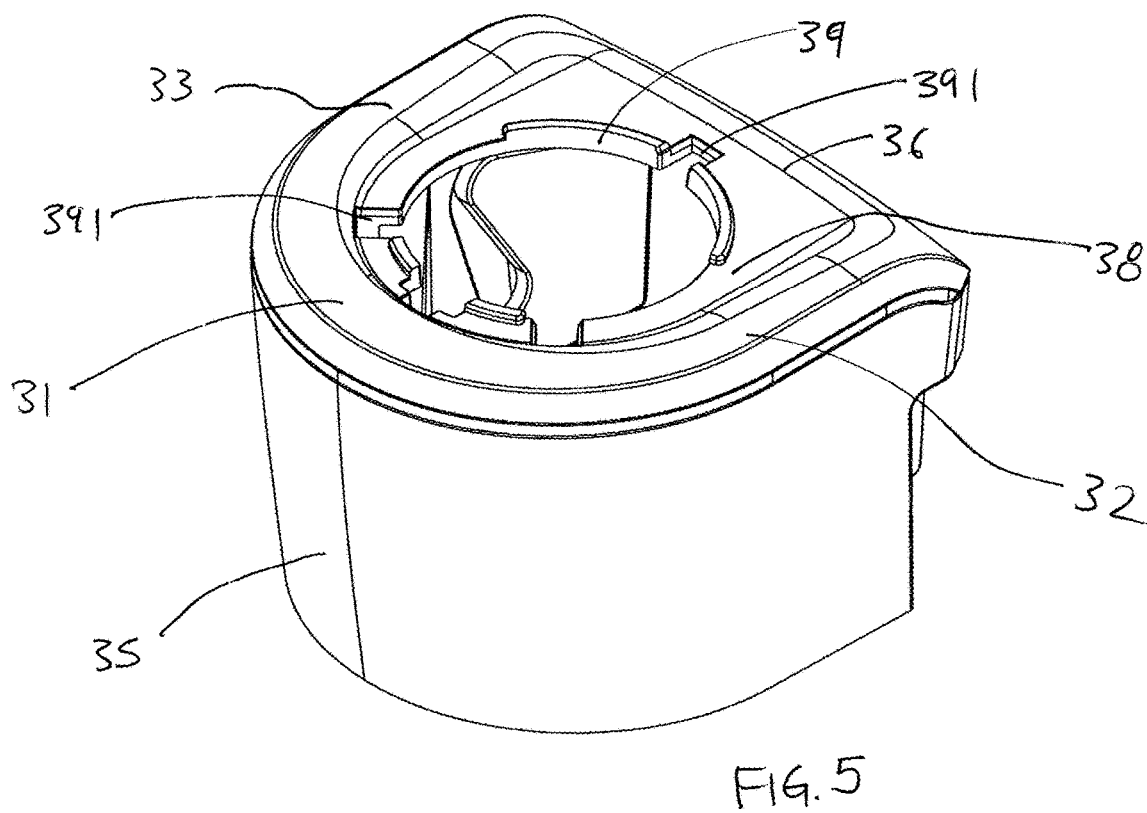
FIG. 5 is right side perspective view of the beverage material holder in the FIG. 1 embodiment with a cartridge receiver removed.

FIG. 1 shows a right side perspective view of a beverage forming system 100. Although the beverage forming system 100 may be used to form any suitable beverage, such as tea, coffee, other infusion-type beverages, beverages formed from a liquid or powdered concentrate, soups, juices or other beverages made from dried materials, or other, in this illustrative embodiment, the system 100 is arranged to form coffee or tea beverages. As is known in the art, a beverage cartridge 1 may be provided to the system 100 and used to form a beverage that is deposited into a user's cup or other suitable container 2. The cartridge 1 may be manually or automatically placed in a brew chamber 15 that includes a holder 3 and cover 4 of the beverage forming system 100. For example, the holder 3 may include a circular, cup-shaped or otherwise suitably shaped cartridge receiver 3a in which the cartridge 1 or other beverage material receptacle may be placed. In this embodiment, the holder 3 includes an opening 39 that is arranged to receive the cartridge receiver 3a, as discussed in more detail below. With a cartridge 1 placed in the holder 3, a handle 5 may be moved by hand (e.g., downwardly) so as to move the cover 4 to a closed position (not shown). In the closed position, the cover 4 at least partially covers the opening 39, e.g., to at least partially enclose the cartridge 1 in a space in which the cartridge is used to make a beverage. For example, with the cartridge 1 held by the holder 3 in the closed position, water or other liquid may be provided to the cartridge 1 (e.g., by injecting the liquid into the cartridge interior) to form a beverage that exits the cartridge 1 and is provided to a cup 2 or other container. Of course, aspects of the invention may be employed with any suitably arranged system 100, including drip-type coffee brewers, carbonated beverage machines, and other systems that deliver water from a tank. Thus, a cartridge 1 need not necessarily be used, but instead the holder 3 may accept loose coffee grounds or other beverage material to make a beverage. For example, the holder 3 may include a filter basket that is accessible to provide packaged or unpackaged beverage material to the filter basket, which may be removable or not. Accordingly, a variety of different types and configurations for a holder 3 with respect to receiving and holding a beverage material may be employed with aspects of the invention.

In accordance with an aspect of the invention, the holder 3 may include one or more walls around an opening of the holder 3 that is arranged to receive beverage material used to make a beverage. The one or more walls, e.g., including front and side walls around the opening, may be downwardly and inwardly sloped toward the opening. By having walls around the opening sloped toward the opening, any liquid, beverage material or other can be directed toward the opening. In some cases, the opening may communicate with a drain that permits liquid or other material that enters the opening to be routed to a drip tray or waste bin. Thus, if coffee grounds or beverage liquid is splashed from an area at the opening to one of the walls, the material may be drained away. This may help keep the area around the opening of the holder clean, e.g., by helping prevent the collection of coffee grounds or other material around the opening.

In some embodiments, the one or more walls around the opening may be continuously sloped, e.g., toward the opening as well as away from the opening, such that the one or more walls do not include a flat area to collect beverage material, liquid or other materials. For example, in one embodiment, front and side walls around the opening may have an upside down U-shape along a cross section taken at a line that extends radially away from the opening. This arrangement may help direct liquid and other materials away and towards the opening, helping to keep the area around the opening more clean.

In some embodiments, the holder may include a peripheral wall that extends upwardly from the opening. The peripheral wall may form a kind of trench or trough with the one or more walls around the opening that slope downwardly and inwardly toward the opening. The trench may collect liquid and other material that is splashed or otherwise contacts the walls, and collected material may be directed to a drain, such as a drip tray or waste bin. In some embodiments, the peripheral wall may be part of a cartridge receiver that is received at the opening and is configured to receive a beverage cartridge used to form a beverage.

In some embodiments, one or more walls around an beverage material opening of a holder may form a seamless shape that aids in keeping the one or more walls clean. For example, front and side walls around the opening may form a continuously curved U-shape around the opening that is free of seams and/or other areas that may collect liquid or other debris.

FIGS. 2-7 show an illustrative arrangement for a holder 3 that incorporates one or more aspects of the invention and that is included in the beverage machine of FIG. 1. In this embodiment, the holder 3 has a body with an opening 39 (see FIG. 5) arranged to receive a beverage material used to form a beverage. A cartridge receiver 3a is received in the opening 39 and is arranged to receive a beverage cartridge 1 that contains beverage material, but this arrangement is not required. For example, the opening 39 could itself be arranged to receive loose beverage material, e.g., the opening 39 may include a filter basket having a cup shape and a filter element configured to hold a beverage material such as coffee grounds so as to mix the beverage material with water to form a beverage that flows through the filter element, leaving insoluble coffee ground material in the basket. Such a filter basket may be removable from the opening 39 in the same way that the cartridge receiver 3a is removable from the opening 39. This may allow different cartridge receivers or other beverage material holders to be exchanged for each other, e.g., to accommodate differently sized or shaped cartridges or to operate with different types of beverage material. In other arrangements, the opening 39 may receive a cartridge 1 directly.

Figure 6:
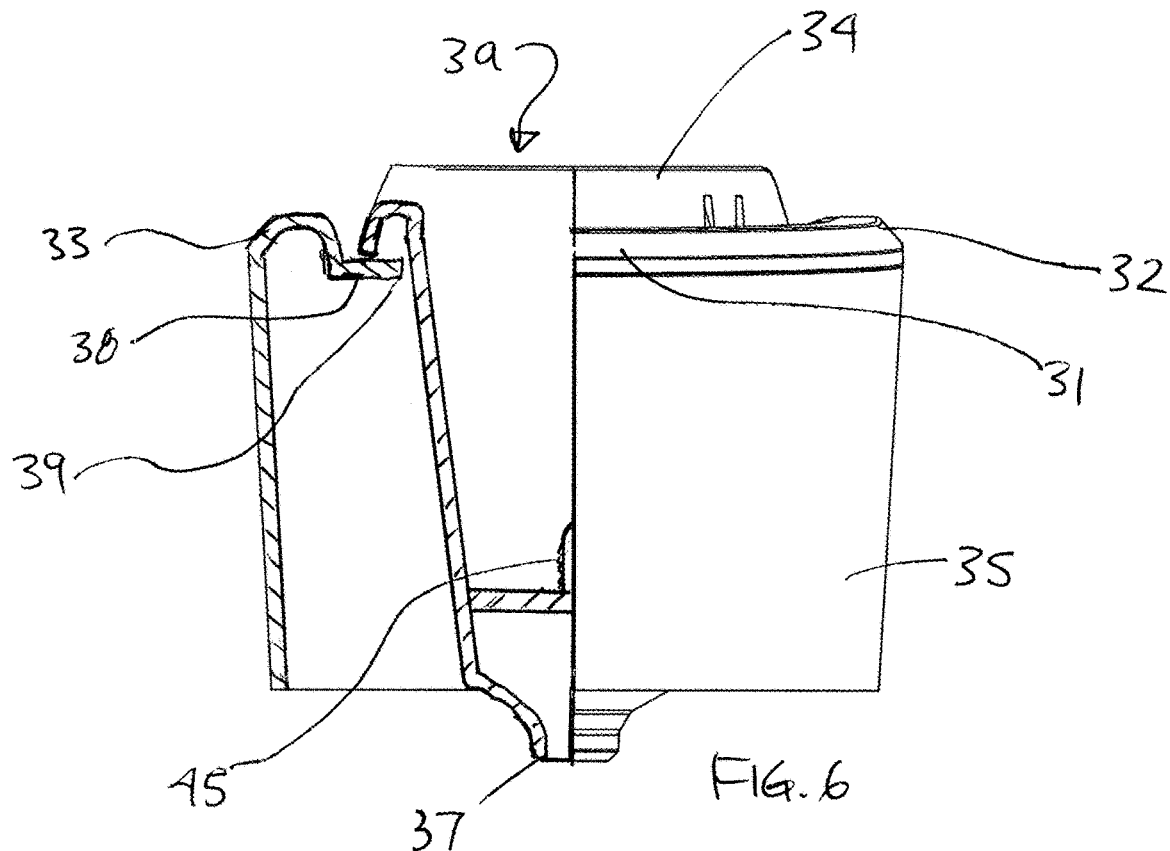
FIG. 6 is a front view of the beverage material holder in the FIG. 1 embodiment and a partial cross sectional view along the line 6-6 in FIG. 4.
Figure 7:
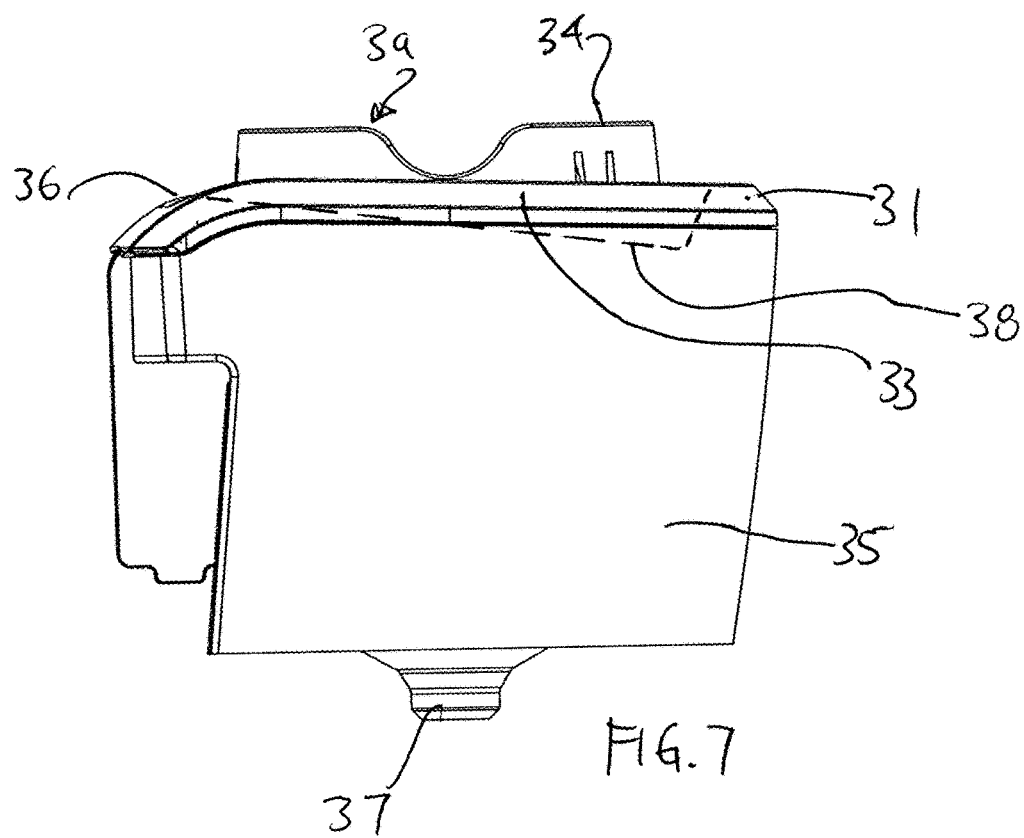
FIG. 7 is a left side view of the beverage material holder in the FIG. 1 embodiment.

As can be seen in FIGS. 2-5, the holder 3 includes a front wall 31 and left and right sidewalls 32, 33 that are arranged around the opening 39 and that slope downwardly and toward the opening 39. In this embodiment, the opening 39 is formed in a bottom wall 38 that is arranged around the opening and extends radially outwardly away from the opening 39 to the front wall 31 and left and right sidewalls 32, 33, as well as to a rear wall 36. In this embodiment, the rear wall 36 does not slope downwardly and toward the opening 39, but rather an uppermost portion of the rear wall 36 is flush with the bottom wall 38 as can be seen in FIG. 7. However, the rear wall 36 could be arranged to have a portion that slopes downwardly and toward the bottom wall 38 and the opening 39. As can be seen in FIG. 6, the right side wall 33 may have a cross sectional shape along a line that extends radially outwardly from the opening 39 that is formed like an upside down U-shape. The left side wall 32 and front wall 31 may be similarly arranged. Thus, each of the front wall 31 and left and right side walls 32, 33 may have an uppermost portion that is positioned above the bottom wall 38 and a radially inner portion that slopes downwardly and toward the bottom wall 38 and the opening 39. As will be appreciated, any liquid, coffee grounds or other material that is splashed or otherwise directed to the walls 31-33 may be directed inwardly and downwardly toward the opening 39, helping to keep the walls 31-33 free of liquid and other debris. Liquid and other material that is directed to outer portions of the walls 31-33 (i.e., radially outward from an uppermost portion of the walls 31-33) may be directed outwardly and away from the opening 39. Liquid and other material directed toward the opening 39 may be directed to a drip tray or waste bin, or to other locations.

In this embodiment, the cartridge receiver 3a includes a peripheral wall 34 that extends upwardly from the opening 39. A radially inner part of the peripheral wall 34 defines a cartridge receiving opening of the receiver 3a, and a radially outer part of the peripheral wall forms a trough with the front and side walls 31-33. Thus, liquid and other material in the area between the front and side walls 31-33 and the peripheral wall 34 may be directed toward a bottom of the trough to collect, either for draining or other direction away from the trough or for removal by a user. As an example, a user may wipe the trough area between the walls 31-33 and the peripheral wall 34 with a cloth to remove unwanted liquid or other debris. In some embodiments, and as can be seen in FIG. 7, the bottom wall 38 may form a bottom of the trough and material that is collected in the trough may be drained or otherwise directed toward a front side of the bottom wall 38. That is, in this embodiment, the bottom wall 38 is sloped toward the front wall 31 so that liquid and other material may be collected at a front side of the bottom wall 38. This may make removal by a user easier, and/or the bottom wall 38 may be provided with a drain hole to direct waste material to an area below the bottom wall 38, such as a drip tray or waste bin. Although in this embodiment a peripheral wall is formed as part of a cartridge receiver 3a, the peripheral wall 34 may be formed as part of the bottom wall 38 (e.g., extending upwardly from the bottom wall 38 at the opening 39) whether or not a cartridge receiver 3a is provided at the opening 39.

In accordance with another aspect of the invention, walls around the opening of the beverage material holder may be arranged to form a continuous curved shape and/or may be seam-free to aid in cleaning of the area of the holder 3 around the opening. In this embodiment, the front and side walls 31-33 form a U-shaped wall with a continuous curve. Also, the U-shaped wall may have no seam or other features that may collect liquid or other material. This may make cleaning of the wall around the opening 39 easier, e.g., allowing for wiping in a single action to remove any debris.

In this embodiment, the opening 39 includes multiple notches 391 formed in a radially outward direction. These notches 391 are formed to receive tab elements on the cartridge receiver 3a that help removably lock the receiver 3a in the opening 39. However, such notches 391 are not required, and the opening 39 may have any suitable shape, such as including a circular, oval, rectangular, etc. opening. Also, the cartridge receiver 3a in this embodiment includes a piercing element 45 arranged to pierce a cartridge placed in the receiver 3a to form an opening through which beverage can exit the cartridge. Such a piercing element 45 is not required for a cartridge receiver 3a or for the holder 3, as cartridges may otherwise be provided with an opening for a beverage exit. Beverage formed in the cartridge receiver 3a may exit the receiver 3a via an outlet 37, which may direct beverage to a user's cup 2 or other receptacle.

Figure 8:
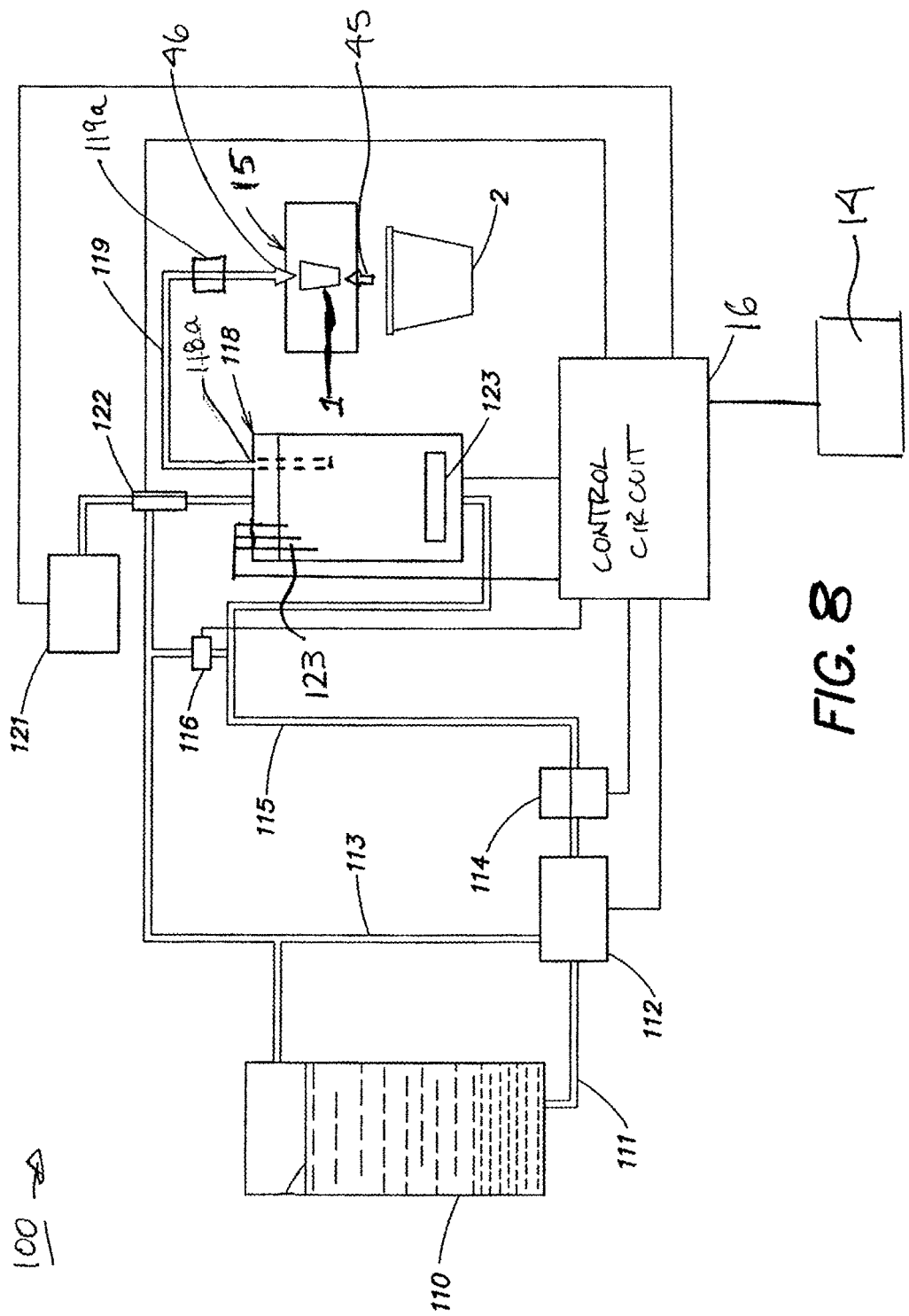
FIG. 8 shows a schematic block diagram of various components that may be included in a beverage forming apparatus.

FIG. 8 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other liquid may be provided to a cartridge 1 in a brew chamber 15 or to another beverage outlet by a liquid supply that, in this embodiment includes a storage tank 110, a supply conduit 111 fluidly connecting the storage tank 110 to an inlet of a pump 112 (such as a centrifugal pump, piston pump, solenoid pump, diaphragm pump, etc.), and a pump conduit 115 that is fluidly connected between the outlet of the pump 112 and a liquid inlet of the heater tank 118. This embodiment includes other optional features, such as a check valve 114 or other flow controller (such as an electronically-controlled valve) that can prevent backflow in the pump conduit 115 from the tank 118 to the pump 112, an optional pump conduit vent 116, which may include a controllable valve or fixed orifice, that allows a siphon in the pump conduit 115 to be broken as necessary, or a pressure relief valve that may open to vent the pump conduit 115 in the case of pressure over a threshold level. A priming conduit 113 may be fluidly connected to the pump 112 to allow the pump 112 to be primed by venting the pump 112. In other arrangements, the conduit 113 may provide air to the pump 112 to allow the pump 112 to pump air through the conduit 115 and to the heater tank 118, e.g., to purge the conduit 115, heater tank 118 and/or other conduits downstream of the heater tank 118. In such a case, the conduit 113 may include a valve that can be opened to permit air flow to the pump 112, and/or a valve to control water flow from the storage tank 110.

Operation of the water pump 112 and other components of the apparatus 100 may be controlled by a control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces (such as a user interface 14), communication buses or other links, a display, switches, relays, triacs, or other components necessary to perform desired input/output or other functions. As discussed above, the user interface 14 may be arranged in any suitable way and include any suitable components to provide information to a user and/or receive information from a user, such as buttons, a touch screen, a voice command module (including a microphone to receive audio information from a user and suitable software to interpret the audio information as a voice command), a visual display, one or more indicator lights, a speaker, and so on.

The heater tank 118 may be provided with a desired amount of liquid by any suitable technique, such as running the pump 112 for a predetermined time, detecting a flow rate or volume of liquid passing through the pump conduit 115 (e.g., at the flow controller 114 which may include a flow meter), operating the pump 112 for a desired number of cycles (such as where the pump is arranged to deliver a known volume of liquid for each cycle, such as for each revolution of a pump shaft), or using any other viable technique. At an initial operation or filling of the heater tank 118, the control circuit 16 may detect that the heater tank 118 is completely filled when a pressure sensor (not shown) detects a rise in pressure indicating that the water has reached the top of the heater tank 118, when a conductive probe 123 detects the presence of liquid in an upper portion of the tank 118, when an optical sensor detects a presence of liquid in the tank conduit 119, and others. Alternately, the control circuit 16 may not detect whether the tank 118 is filled or not, and simply assume that the tank 118 is filled once a first fill operation is completed, e.g., by operating the pump 112 for a time or number of cycles that is known to fill the tank 118.

Water in the tank 118 may be heated by way of a heating element 123 whose operation is controlled by the control circuit 16 using input from a temperature sensor or other suitable input. Water in the heater tank 118 may be dispensed via the heater tank conduit 119 to the brew chamber 15 or other beverage forming station or outlet. Liquid may be discharged from the heater tank 118 by the pump 112 operating to force additional unheated liquid into the tank 118, thereby displacing water out of the tank 118 and to the brew chamber 15. A flow sensor or other suitable device may be used to determine the amount of liquid delivered to the tank 118, and thus the amount of liquid delivered to the brew chamber 15. Alternately, the pump 112 may be a piston-type, diaphragm-type or other pump arranged such that a known volume of liquid may be delivered from the pump 112 to the tank 118, thus causing the same known volume to be delivered to the brew chamber 15. Thus, a specified volume of liquid may be delivered to the brew chamber 15 by operating the pump 112 to deliver the specified volume of liquid to the tank 118, e.g., a diaphragm pump may deliver 5 ml for each pump stroke, and thus 100 ml of liquid may be delivered to the tank 118 by operating the pump through 20 pump cycles (e.g., pump strokes or revolutions of a pump shaft). Liquid may be introduced into the cartridge 1 at any suitable pressure, e.g., 1-2 psi or higher, and the pressure may be adjustable by the control circuit 16. Although in this embodiment the tank conduit 119 is shown as connected simply to the top of the tank 118 at an outlet of the tank 118 without extending into the tank at all, the conduit 119 could be arranged in other suitable ways. The outlet of the heater tank 118 could be arranged at an extreme top of the tank 118, or in other ways in other embodiments, e.g., at the top of the tank 118 but below the extreme top portion of the tank 118, or at a location between the top and bottom of the tank 118 such as where the air pump 121 is used to move water from the tank 118 to the brew chamber 15 like that shown in FIG. 1 of U.S. Pat. No. 7,398,726. The tank conduit 119 may include a check valve 119a, solenoid valve or other flow controller, e.g., to help prevent backflow in the tank conduit 119 from the brew chamber 15 to the tank 118 and/or to prevent flow from the tank 118 to the brew chamber 15.

The brew chamber 15 may include any beverage making ingredient or material, such as ground coffee, tea, a flavored drink mix, or other beverage medium, e.g., contained in a cartridge 1 or not. Once liquid delivery by the pump 112 to the tank 118 is complete, an air pump 121 may be operated to force air into the top of the tank 118 and/or into the conduit 119 to purge a top portion of the tank 118, the conduit 119 and/or cartridge 1 of liquid, at least to some extent. A valve 122 may be used to control air flow into and/or out of the tank 118.

While in this illustrative embodiment, a liquid supply system arranged to provide liquid to a beverage outlet (at the brew chamber 15) may include a pump 112, storage tank 110 and other components, these components are not necessarily required and/or other components may be included. For example, a check valve 114, flow meter, vent valve 116 (e.g., to help prevent the formation of a siphon), etc., may or may not be included with the liquid supply. Alternately, other mechanisms for providing liquid may be used, such as by gravity flow of liquid, flow forced by air pressure, or other motive force to move liquid from a storage tank 110, flow of liquid from a plumbed or other "city water" supply, and others.

For those systems employing a cartridge 1, once a cartridge is located in the brew chamber 15 in the closed position, the beverage forming system 100 may use the cartridge 1 to form a beverage. For example, one or more inlet needles 46 associated with the cover 4 or other part of the system 100 may pierce the cartridge 1 (e.g., a lid of the cartridge) so as to inject heated water or other liquid into the cartridge 1. The injected liquid may form the desired beverage or a beverage precursor by mixing with beverage material in the cartridge 1. The cover 4, holder 3 or other portion of the system 100 may also include one or more outlet needles 45 or other elements to puncture or pierce the cartridge 1 at an outlet side to permit the formed beverage to exit the cartridge 1. Other inlet/outlet piercing arrangements are possible, such as multiple needles, a shower head, a non-hollow needle, a cone, a pyramid, a knife, a blade, etc. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, a lid or other portion of a cartridge may be pierced, or otherwise effectively opened for flow, by introducing pressure at an exterior of the lid. For example, a water inlet may be pressed and sealed to the lid exterior and water pressure introduced at the site. The water pressure may cause the lid to be pierced or otherwise opened to allow flow into the cartridge 1. In another arrangement, the cartridge lid may include a valve, conduit or other structure that opens when exposed to a suitable pressure and/or when mated with a water inlet tube or other structure. As with the inlet piercing arrangement, the outlet piercing arrangement may be varied in any suitable way. Thus, the outlet piercing element 45 may include one or more hollow or solid needles, knives, blades, tubes, and so on. Alternately, the cartridge 1 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 45 remains in place to receive beverage as it exits the opening formed in the cartridge. However, in other embodiments, the piercing element 45 may withdraw after forming an opening, allowing beverage to exit the opening and be received without the piercing element 45 being extended into the cartridge 1. Other arrangements for a beverage outlet are possible however, e.g., the cartridge may have a permeable portion that allows beverage to exit cartridge 1. Also, there is no requirement that an inlet and/or an outlet pierce a cartridge to provide liquid to, or receive beverage from, a cartridge. Instead, communication with a cartridge may be performed using any suitable ports or other features.

With a beverage cartridge 1 provided in the brew chamber 15 or beverage material (if used) otherwise provided with the brew chamber 15, the control circuit 16 may operate in different ways to dispense a beverage. In some embodiments, the control circuit 16 may automatically select one or more brew parameters for automatically controlling the liquid supply and liquid conditioner portions to dispense a beverage during a dispensing operation. For example, the control circuit 16 may select default values for parameters such as a beverage volume, beverage temperature, whether beverage frothing or whipping will be employed, a beverage dispense time or speed, a precursor liquid flow rate, a precursor liquid pressure, whether beverage chilling will be employed, whether brew chamber air or steam purge will be employed, whether beverage material pre-wet or pulse-type brewing will be employed and if so time periods between liquid delivery, and others. Such parameters may be automatically determined in different ways, such as by reading parameter values from an information element (such as an RFID tag) on a cartridge 1, receiving input from a user via a user interface 14, by employing default values stored in a memory of the control circuit 16, and/or by a combination of such techniques or others. In some cases, the control circuit 16 may begin a dispensing operation once the brew parameter values are set, or in response to additional user input such as the user pressing a brew start button, e.g., the button 145 in FIG. 1. In one example, a user may press one of the beverage volume buttons 141-144 in FIG. 1 to select a beverage volume and then press a brew start button 145 to cause the control circuit 16 to start an automated dispensing operation. Other brew parameters such as beverage temperature, etc. may be automatically selected by the control circuit 16 using default values unless the user provides additional input to adjust those values.

The control circuit 16 may execute an automated dispensing operation (in this example in response to depression of the start button 145) in different ways since dispensing processes may include different steps which may be performed in series and/or in parallel. For example, in some embodiments the heater tank 118 may store a volume of pre-heated water such that the control circuit 16 may immediately control the pump 112 to deliver additional water to the tank 118, thereby causing the flow of heated water from the tank 118 to the brew chamber 15 at the start of a dispensing operation. In other embodiments, water in the heater tank 118 may first need to be heated, and thus the control circuit 16 may first cause the heating element 123 to heat water in the tank 118, and then automatically start water delivery once heating is complete.

With water or other liquid sufficiently heated in the heater tank 118, the control circuit 16 may continue with the automated process of beverage dispensing by causing the pump 112 to deliver liquid to the tank 118, thereby delivering heated liquid to the brew chamber 15. The control circuit 16 may sense or otherwise keep track of a volume of liquid delivered to the brew chamber 15 so that the selected beverage volume can be dispensed. For example, the control circuit 16 may cause the pump 112 to operate a specified number of cycles where a particular volume of liquid is delivered by the pump 112 for each pump cycle. Alternately, a flow meter may be used by the control circuit 16 to detect a volume of liquid delivered to the brew chamber 15, or other techniques.

While aspects of the invention may be used with any suitable cartridge, or no cartridge at all, some cartridges may include features that enhance the operation of a beverage forming system 100. As is known in the art, the cartridge 1 may take any suitable form such as those commonly known as a sachet, pod, capsule, container or other. For example, the cartridge 1 may include an impermeable outer covering within which is housed a beverage medium, such as roasted and ground coffee or other. The cartridge 1 may also include a filter so that a beverage formed by interaction of the liquid with the beverage medium passes through the filter before being dispensed into a container 2. As will be understood by those of skill in the art, cartridges in the form of a pod (e.g., having opposed layers of permeable filter paper encapsulating a beverage material) may use the outer portion of the cartridge 1 to filter the beverage formed. The cartridge 1 in this example may be used in a beverage machine to form any suitable beverage such as tea, coffee, other infusion-type beverages, beverages formed from a liquid or powdered concentrate, etc. Thus, the cartridge 1 may contain any suitable beverage material, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutraceuticals, etc.), and/or other beverage-making material (such as powdered milk or other creamers, sweeteners, thickeners, flavorings, and so on). In one illustrative embodiment, the cartridge 1 contains a beverage material that is configured for use with a machine that forms coffee and/or tea beverages, however, aspects of the invention are not limited in this respect.

As used herein, "beverage" refers to a liquid substance intended for drinking that is formed when a liquid interacts with a beverage material, or a liquid that is dispensed without interacting with a beverage material. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage forming system comprising:
    a liquid supply arranged to provide a liquid for forming a beverage;
    a brew chamber arranged to hold a beverage material for mixing with the liquid to form a beverage;
    a liquid conditioner arranged to heat or cool the liquid that is provided to the brew chamber; and
    a control circuit arranged to control the liquid supply and the liquid conditioner to deliver heated or cooled liquid to the brew chamber to form the beverage, wherein the brew chamber includes a holder with an opening through which the beverage material is received into the holder, the holder including walls that slope downwardly and inwardly toward the opening on at least a front side and left and right sides of the opening, wherein the walls at the front side, left side and right side of the opening form a U-shaped wall, and wherein the holder includes a bottom wall in which the opening is formed, the bottom wall being planar and extending outwardly from the opening to the walls.

2. The system of claim 1, wherein the U shaped wall has a continuous curve.

3. The system of claim 1, wherein the holder includes a rear wall on a rear side of the opening, the rear wall sloping downwardly and inwardly toward the opening.

4. The system of claim 1, wherein the bottom wall extends outwardly from the opening to the walls at the front side, left side and right side of the opening.

5. The system of claim 1, wherein the holder includes a cartridge receiver arranged in the opening, the cartridge receiver being configured to receive a cartridge containing the beverage material.

6. The system of claim 5, wherein the cartridge receiver includes a peripheral wall that extends upwardly from the opening such that the peripheral wall and the walls at the front side, left side and right side of the opening together form a trough around the opening.

7. The system of claim 1, wherein the holder includes a peripheral wall that extends upwardly from the opening such that the peripheral wall and the walls at the front side, left side and right side of the opening together form a trough around the opening.

8. The system of claim 1, wherein the walls at the front side, left side and right side of the opening each have a cross section along a line extending radially outwardly from the opening that has an upside down U-shape.

* * * * *